US008597559B2

(12) United States Patent
Robertson et al.

(10) Patent No.: US 8,597,559 B2
(45) Date of Patent: Dec. 3, 2013

(54) METHOD OF MAKING A SHAKER SCREEN

(75) Inventors: Graham Robertson, Edinburgh (GB); Brian S. Carr, Burlington, KY (US); Robert M. Barrett, Walton, KY (US)

(73) Assignees: M-I L.L.C., Houston, TX (US); United Wire Limited, Edinburgh (GB)

( * ) Notice: Subject to any disclaimer, the term of this patent is extended or adjusted under 35 U.S.C. 154(b) by 141 days.

(21) Appl. No.: 12/867,054

(22) PCT Filed: Feb. 4, 2009

(86) PCT No.: PCT/US2009/033069
§ 371 (c)(1), (2), (4) Date: Aug. 11, 2010

(87) PCT Pub. No.: WO2009/102597
PCT Pub. Date: Aug. 20, 2009

(65) Prior Publication Data
US 2010/0307962 A1 Dec. 9, 2010

Related U.S. Application Data

(60) Provisional application No. 61/027,648, filed on Feb. 11, 2008.

(51) Int. Cl.
*B29C 45/14* (2006.01)

(52) U.S. Cl.
USPC ......... 264/275; 264/273; 264/237; 264/342 R

(58) Field of Classification Search
None
See application file for complete search history.

(56) References Cited

U.S. PATENT DOCUMENTS

| | | | | |
|---|---|---|---|---|
| 3,865,154 A | 2/1975 | Cox et al. | |
| 5,816,413 A | 10/1998 | Boccabella et al. | |
| 5,927,511 A * | 7/1999 | Riddle et al. | 209/405 |
| 7,228,971 B2 * | 6/2007 | Mooney et al. | 209/398 |
| 7,316,758 B2 | 1/2008 | Armstrong | |
| 7,584,858 B2 * | 9/2009 | Barrett et al. | 209/405 |
| 7,757,864 B2 * | 7/2010 | Barrett et al. | 209/274 |
| 2003/0136710 A1 | 7/2003 | Adams et al. | |
| 2008/0135463 A1 * | 6/2008 | Scott et al. | 209/319 |

FOREIGN PATENT DOCUMENTS

| | | |
|---|---|---|
| CA | 2281098 A1 | 9/1998 |
| DE | 1957065 A1 | 5/1971 |
| EP | 0 073 319 A2 | 3/1983 |
| EP | 706837 A1 | 4/1996 |
| WO | 03/013690 A1 | 2/2003 |
| WO | 2004/069374 A1 | 8/2004 |

OTHER PUBLICATIONS

Extended European Search Report issued in corresponding European Application No. 09710496.2; Dated May 13, 2013 (11 pages).
Office Action Issued in corresponding Mexican Application No. MX/a/2010/008785 with English language correspondence reporting the same; Dated May 15, 2013 (7 pages).

(Continued)

*Primary Examiner* — Edmund H. Lee
(74) *Attorney, Agent, or Firm* — Osha Liang LLP

(57) ABSTRACT

A shaker screen for attachment to a bed of a shaker includes a screen frame having at least one mesh screen attached to the top side of the screen frame, wherein the screen frame is preferentially bowed prior to attaching the mesh screen to the screen frame.

12 Claims, 6 Drawing Sheets

(56) References Cited

OTHER PUBLICATIONS

Office Action issued in corresponding Eurasian Application No. 201070951/31; Dated May 22, 2012 (3 pages).
International Search Report from PCT/US2009/033069 dated Aug. 20, 2009 (2 pages).
Written Opinion from PCT/US2009/033069 dated Aug. 20, 2009 (5 pages).
Notification Concerning Transmittal of International Preliminary Report on Patentability issued in related International Patent Application No. PCT/US2009/033069; Dated Aug. 26, 2010 (7 pages).
Office Action issued in corresponding Chinese Application No. 200980104878.7; Dated Aug. 23, 2012 (12 pages).
Examiner's Report issued in corresponding Canadian Application No. 2,715,267; Dated Dec. 1, 2011 (3 pages).

* cited by examiner

METHOD OF MAKING A SHAKER SCREEN

BACKGROUND

1. Field of the Disclosure

Embodiments disclosed herein relate generally to oilfield shakers. More particularly, embodiments disclosed herein relate to apparatus and methods for pre-tensioned screens for oilfield shakers.

2. Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

One significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates must be removed.

Apparatus in use today to remove cuttings and other solid particulates from drilling mud are commonly referred to in the industry as "shale shakers." A typical shaker is shown in FIG. 1. In typical shakers, a screen 102 is detachably secured to the vibrating shaker machine 100. With the screen or multiple screens secured in place, a tray is formed with the opposed, parallel sidewalls 103 of shaker 100. The drilling mud, along with drill cuttings and debris, is deposited on top of screen 102 at one side. Screen 102 is vibrated at a high frequency or oscillation by a motor or motors for the purpose of screening or separating materials placed on screen 102. The liquid and fine particles will pass through screen 102 by force of gravity and be recovered underneath. Solid particles above a certain size migrate and vibrate across screen 102 or screens where they are removed. Filtering elements attached to screen 102 may further define the largest solid particle capable of passing therethrough.

Due to the conventional design of and installation methods for pre-tensioned screens, sealing between the screen frame and shaker bed may be insufficient to prevent drilling fluid from bypassing the screen frame and/or filtering element. Accordingly, there exists a need for a shaker screen without excessive bowing.

SUMMARY OF THE DISCLOSURE

In one aspect, embodiments disclosed herein relate to a shaker screen for attachment to a bed of a shaker, the shaker screen including a screen frame having at least one mesh screen attached to the top side of the screen frame, wherein the screen frame is preferentially bowed prior to attaching the mesh screen to the screen frame.

In other aspects, embodiments disclosed herein relate to a method of manufacturing a shaker screen, the method including providing a screen frame mold having a neutral axis, positioning reinforcement structure in the screen frame above the neutral axis of the screen frame mold, injecting a material in the screen frame mold to form a screen frame having a neutral axis, and removing the screen frame from the mold, wherein the material contracts below the neutral axis of the screen frame.

In other aspects, embodiments disclosed herein relate to a method of manufacturing a shaker screen, the method including machining a preferential bow into a screen frame mold and injecting a material in the screen frame mold, positioning reinforcement structure in the screen frame, injecting a material in the screen frame mold and forming a screen frame, and cooling the screen frame before moving the screen frame from the screen frame mold, wherein the screen frame includes a preferential bow.

Other aspects and advantages of the invention will be apparent from the following description and the appended claims.

DETAILED DESCRIPTION

In one aspect, embodiments disclosed herein relate to pre-tensioned composite screens for an oilfield shaker. More specifically, embodiments disclosed herein relate to methods for manufacturing pre-tensioned composite shaker screens.

Figure 1:
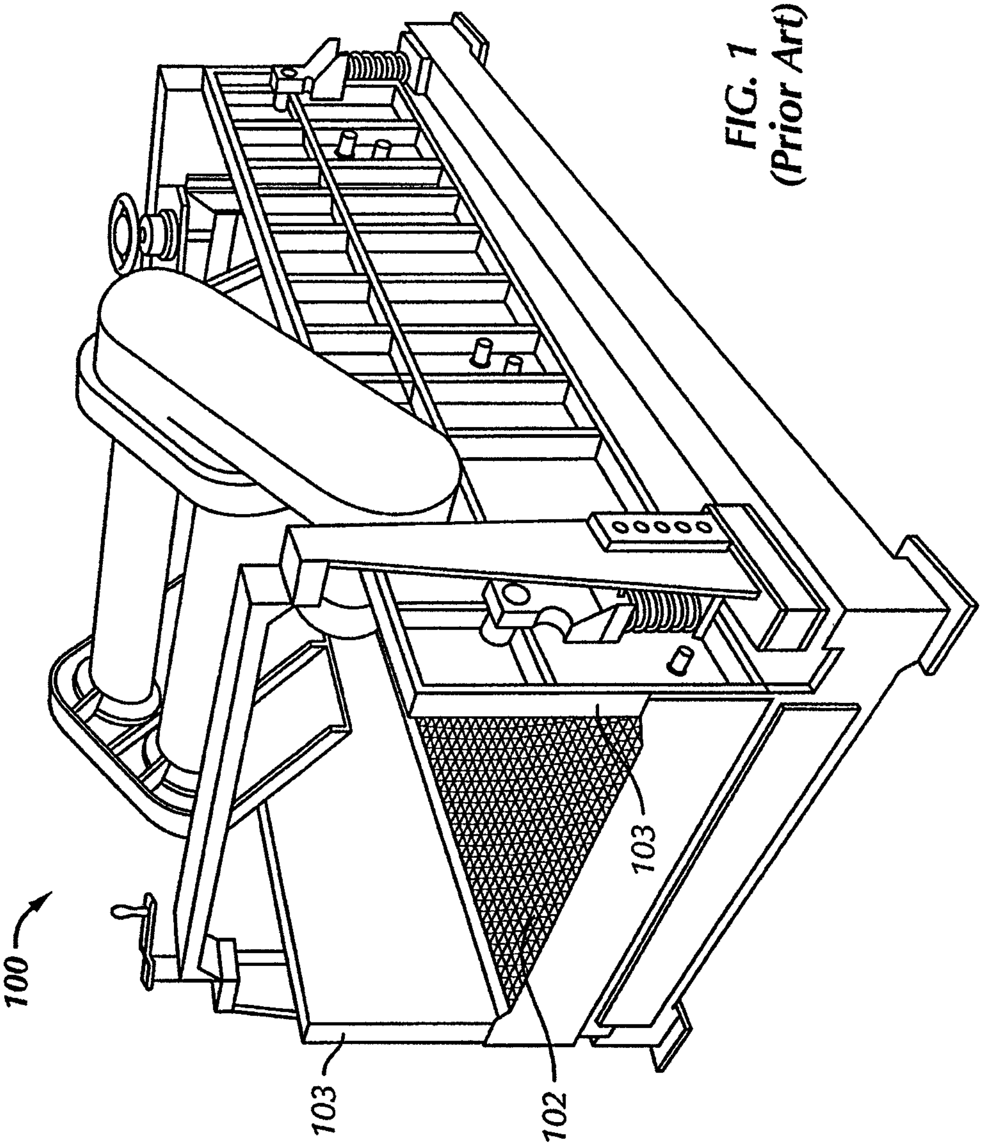
FIG. 1 (Prior Art)
FIG. 1 is a prior art vibratory shaker.
Figure 2:
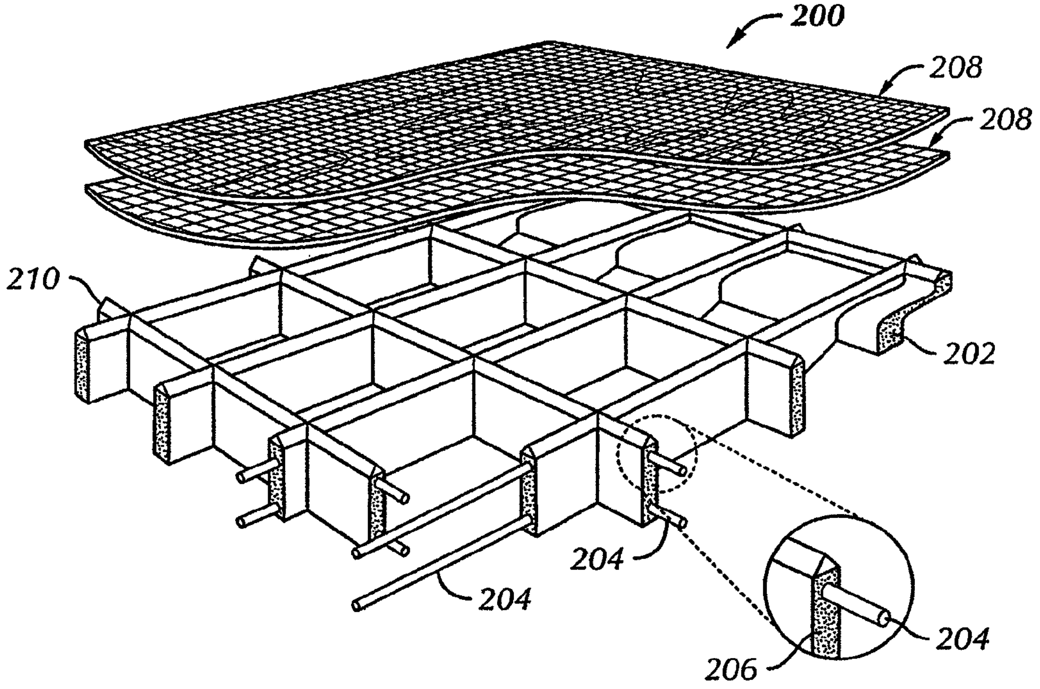
FIG. 2 is a shaker screen with a screen frame and wire mesh screen in accordance with embodiments of the present disclosure.

Referring to FIG. 2, embodiments disclosed herein generally include a screen frame 202 and at least one filtering element 208 attached to screen frame 202. Screen frame 202 may be formed from any material and by any method known in the art. In certain embodiments, screen frame 202 may be a composite frame formed from a frame sub-structure including high-strength steel beams, having a hollow cross-section, and high strength steel rods 204. The frame sub-structure may be enclosed in a high-strength, glass reinforced plastic outer frame 206, wherein the frame sub-substructure forms part of both cross-members and/or transverse ribs (not shown). The composite material may include high-strength plastic, mixtures of high-strength plastic and glass, high-strength plastic reinforced with high-tensile-strength steel rods, and any combination thereof. One of ordinary skill in the art will appreciate that the frame sub-structure and the outer frame may be formed in any configuration and from any material or combination of materials known in the art. Alternatively, screen frame 202 may be formed by injection molding, gas-assisted injection molding, extrusion, and/or any other process known in the art.

In embodiments using injection molding, a molten material is injected at a high pressure into a mold having an inverse shape of a desired grid. The mold may be formed by a toolmaker or mold maker from metals (e.g., steel or aluminum) and precision-machined to form smaller, more detailed features. Once the mold is filled with molten material, the molten material is allowed to cure and is then removed from the mold. The grid may be filled with any molten material known to one of ordinary skill in the art. Further processes of forming composite frames are discussed in U.S. patent application Ser. No. 11/859,223, assigned to the present assignee and fully incorporated herein by reference.

Still referring to FIG. 2, filtering element 208 may include, for example, a mesh, a fine screen cloth, combinations thereof, and/or any other materials known to one of ordinary skill in the art. Furthermore, filtering elements 208 may be formed from, for example, plastics, metals, alloys, fiberglass, composites and/or polytetrafluorethylene. In certain embodiments, multiple layers of filtering elements 208 may be used, and in such multiple layer filtering elements 208, filtering elements 208 with different size perforations may be used. While attaching filtering element 208 to composite screen 202, filtering element 208 may be pre-tensioned. Filtering element 208 may then be attached to screen frame 202 by, for example, heat staking, ultrasonic welding, mechanical fastening, chemical adhesion, and/or thermal bonding. One of ordinary skill in the art will appreciate that filtering element 208 may be attached to screen frame 202 with any method known in the art.

Figure 3A:
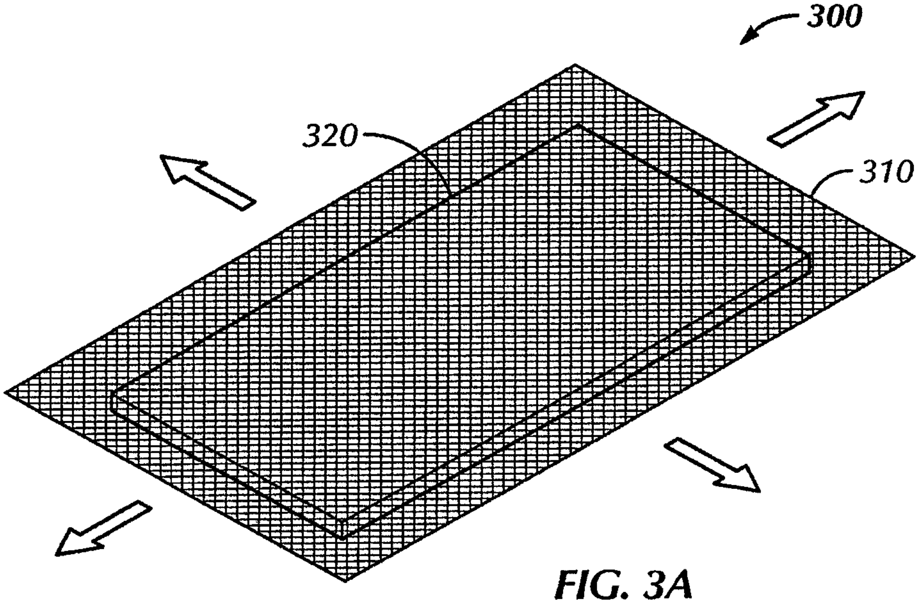
FIG. 3A is an assembly view of a screen frame before installation of the mesh screen in accordance with conventional methods.

Referring to FIG. 3A, an assembly view of a shaker screen 300 prior to installation of a wire mesh screen 310 on a screen frame 320 is shown. Shaker screen 300 includes a screen frame 320 which is made by molding a thermoplastic framework, and further includes a wire mesh screen 310 that is stretched and melted onto screen frame 320. Screen frame 320 is initially substantially flat and includes an integral welded wire grid (204 in FIG. 2) to provide strength as well as thermal stability for screen frame 320, which may be subjected to high temperatures when wire mesh 310 is melted onto it.

Figure 3B:
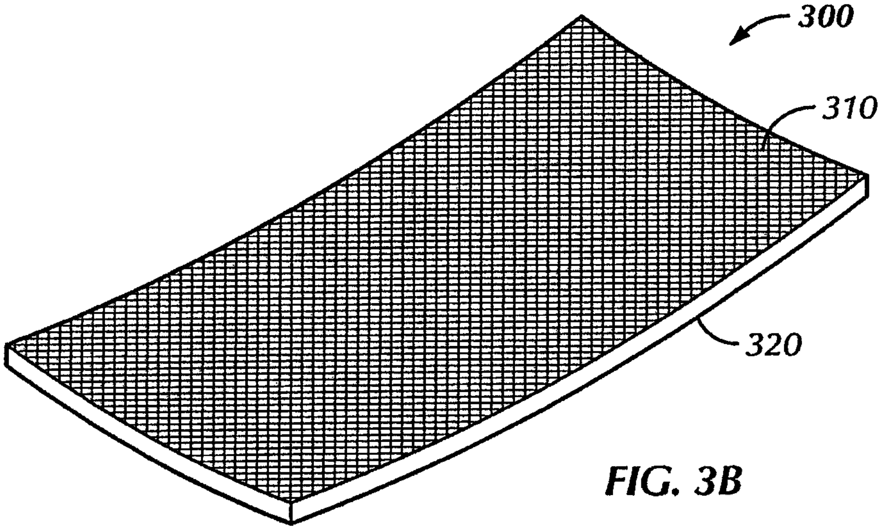
FIG. 3B is an assembly view of a screen frame after installation of the mesh screen in accordance with conventional methods.

Referring now to FIG. 3B, as assembly view of shaker screen 300 after stretching and melting wire mesh screen 310 on screen frame 320 is shown. Wire mesh screen 310 may be tensioned on a stretching fixture (not shown) and melted onto screen frame 320 using a hot plate or other devices known to those skilled in the art. When the tension is taken off of the stretching fixture, wire mesh screen 310 may "spring" back causing a bow in screen frame 320 as shown. On shaker screens where a seal is required on an underside periphery, or where there may be structural support on the underside at a center of the shaker screen, the bow may prevent an adequate seal from being achieved. Furthermore, because the periphery of the shaker screen may not properly seat in a shaker screen bed, excess vibrations or whipping may occur in these areas due to the vibratory forces of the shaker. Therefore, a method to form a shaker screen to control the bowing or to provide a preferential bow of the shaker screen is now described.

Figure 4A:
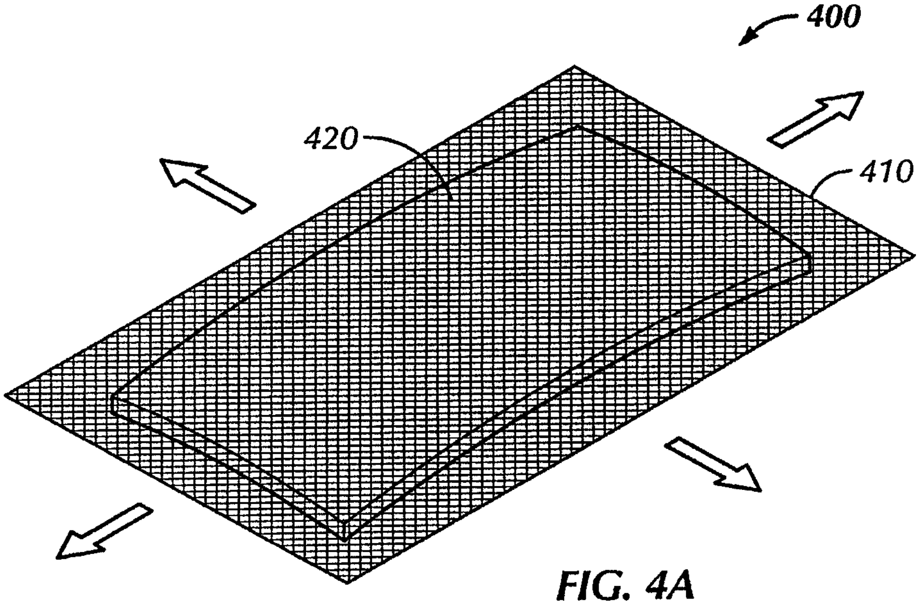
FIG. 4A is an assembly view of a screen frame prior to installation of the mesh screen in accordance with embodiments of the present disclosure.
Figure 4B:
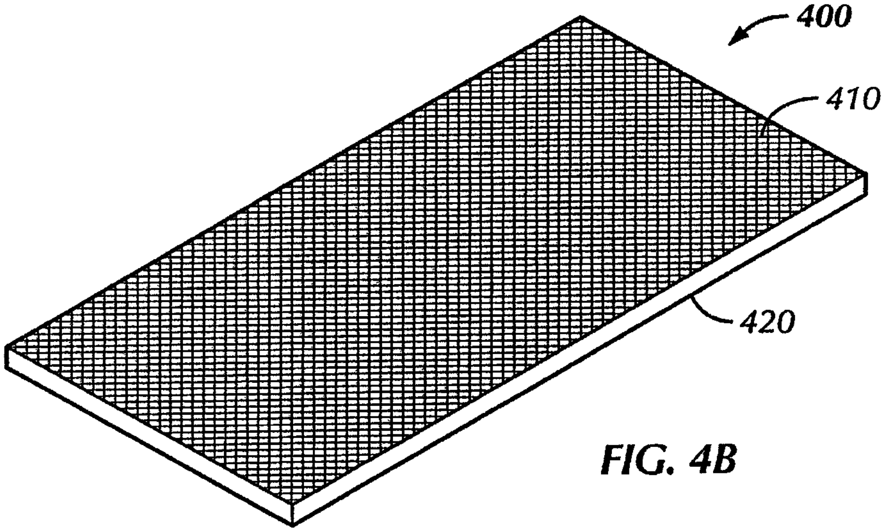
FIG. 4B is an assembly view of a screen frame after installation of the mesh screen in accordance with embodiments of the present disclosure.

Referring to FIG. 4A, an assembly view of a shaker screen 400, prior to installation of wire screen mesh 410 onto screen frame 420, is shown in accordance with embodiments of the present disclosure. Screen frame 420 may initially be molded with a preferential bow incorporated into it. As used herein, the preferential bow may be defined as an initial and intentional bow incorporated into screen frame 420 to compensate for tension caused by wire screen mesh 410 once released from the stretching machine. Once wire screen mesh 410 has been released from the stretching machine, spring back forces of the tensioned wire screen mesh 410 may pull the bowed screen frame 420 back toward a more planar or flat configuration as shown in FIG. 4B.

As described above, the tendency of the screen frame material to shrink or contract after molding and cooling may be used to configure a preferential bow in the screen frame. As previously described, the molding process requires a molten plastic or other suitable material to be injected into a mold or die cavity. After injecting the plastic material, the mold is then cooled, usually via waterways machined in the mold tool, so that the part may be handled upon removal from the mold. Because the shape is formed at a high temperature and then cooled, the plastic may naturally want to contract due to its natural thermal expansion/contraction properties. When the part is removed from the constraints of the mold, it is then free to contract.

Figure 5A:
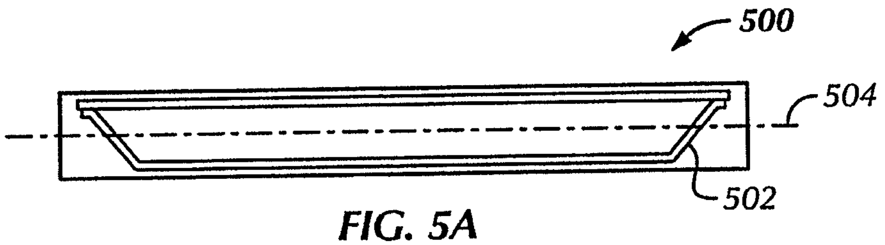
FIG. 5A is a section view of a screen frame mold prior to injection of a screen frame material into the screen frame mold in accordance with conventional methods.

Referring to FIG. 5A, a section view of a conventional screen frame mold 500 before injecting the frame material to form the screen frame is shown. A steel structure 502 is positioned in mold 500 above and below a neutral axis 504 prior to injecting the plastic material. Neutral axis 504 may be defined as the axis passing through the geometric center of screen frame mold 500. Steel structure 502 provides added strength as well as thermal stability to the screen frame when formed, which is subjected to high temperatures when the mesh screen is melted onto it. FIG. 5A shows the near symmetrical geometry of steel structure 502 above and below neutral axis 504 of screen frame mold 500.

Figure 5B:
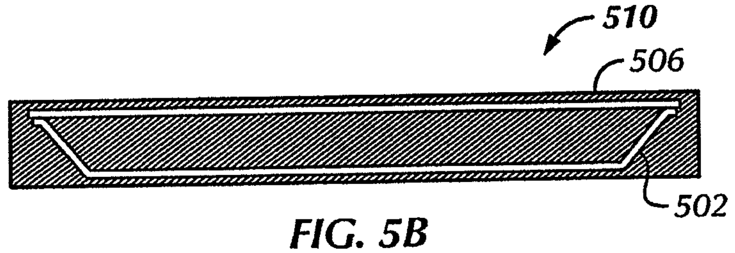
FIG. 5B is a section view of a screen frame after injection of a screen frame material into the screen frame mold in accordance with conventional methods.

Referring now to FIG. 5B, a section view of a screen frame 510 is shown after having been removed from screen frame mold 500 (FIG. 5A). In existing molding processes, the amount of contraction observed may be very small because of steel structure 502 placed in screen frame 510. Steel structure 502 restricts frame material 506 from contracting as much as it would without the added steel structure 502, which means any contractions of frame material 506 may be equal or close to equal above and below neutral axis 504. Because of the placement of steel structure 502, the contraction of frame material 506 may be restricted equally above and below neutral axis 504, which results in a substantially flat molded screen frame 510.

Figure 6A:
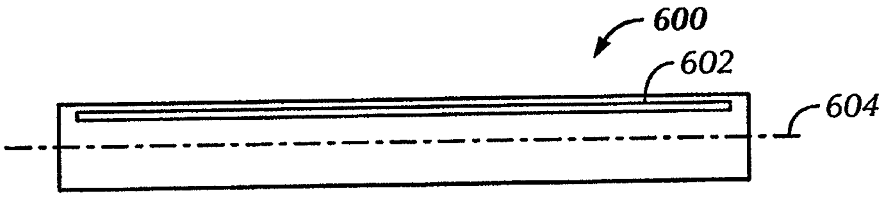
FIG. 6A is a section view of a screen frame mold prior to injection of a screen frame material into the screen frame mold in accordance with embodiments of the present disclosure.

Referring now to FIG. 6A, a section view of a screen frame mold 600 before injecting plastic material to form the screen frame is shown in accordance with embodiments of the present disclosure. Steel structure 602, or other appropriate reinforcement material, is positioned in mold 600 above neutral axis 604 prior to injecting plastic material. In certain embodiments, a trial and error method to determine a proper positioning of steel structure 602 in a screen frame to induce a certain preferential bow may be used as understood by those skilled in the art.

Figure 6B:
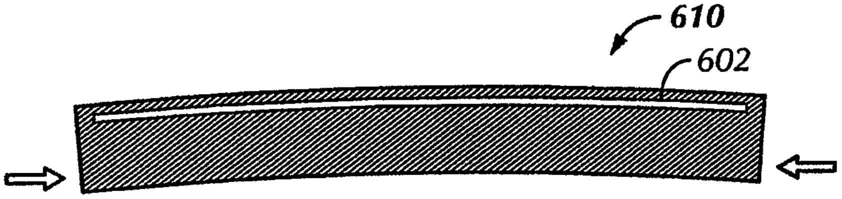
FIG. 6B is a section view of the screen frame after removal from the screen frame mold of FIG. 6A in accordance with embodiments of the present disclosure.

Referring to FIG. 6B, a section view of a screen frame 610 is shown after having been removed from screen frame mold 600 (FIG. 6A), in accordance with embodiments of the present disclosure. As shown, the natural contraction of the plastic material in combination with the placement of the steel structure, creates a preferential bow in screen frame 610 after it is removed from mold 600. Contraction of the plastic material above neutral axis 604 is restricted by placement of steel structure 602 near the top of the mold, while the material below the neutral axis 604 is free to contract due to the lack of steel structure 602 in this region. The unequal placement of steel structure 602 above and below neutral axis 604 is thus used to induce the preferential bow.

In alternate embodiments, the preferential bow may initially be designed as a part of the molded screen frame. The mold or die tool used to form the screen frame may be machined to incorporate the preferential bow. As such, the mold may be configured to produce a screen frame with the preferential bow. Further, the steel structure forming the internal reinforcing grid may be machined or formed in the preferentially bowed shape and positioned in the screen frame mold prior to injecting plastic material. Therefore, the mold tool may already be configured with the preferential bow requiring only the plastic material to be injected. After the material is cooled, the screen frame may be removed from the mold tool with a molded preferential bow.

In still further embodiments, a combination of embodiments already described may be used. A mold tool used to form the screen frame may be machined to incorporate the preferential bow with steel structure to form the internal reinforcing grid also machined to form the preferential bow. Steel structure may then be positioned in the screen frame mold only above the neutral axis before injecting the plastic material to form the screen frame. The molded screen frame may then be removed from the mold and the natural contraction of the plastic material creates a preferential bow in the screen frame. Contraction of the plastic material above the neutral axis is restricted by placing the steel structure at the top, while the material below the neutral axis is free to contract due to the lack of steel structure in this region. The unequal placement of the steel structure above and below the neutral axis is used to induce the preferential bow.

Figure 7A:
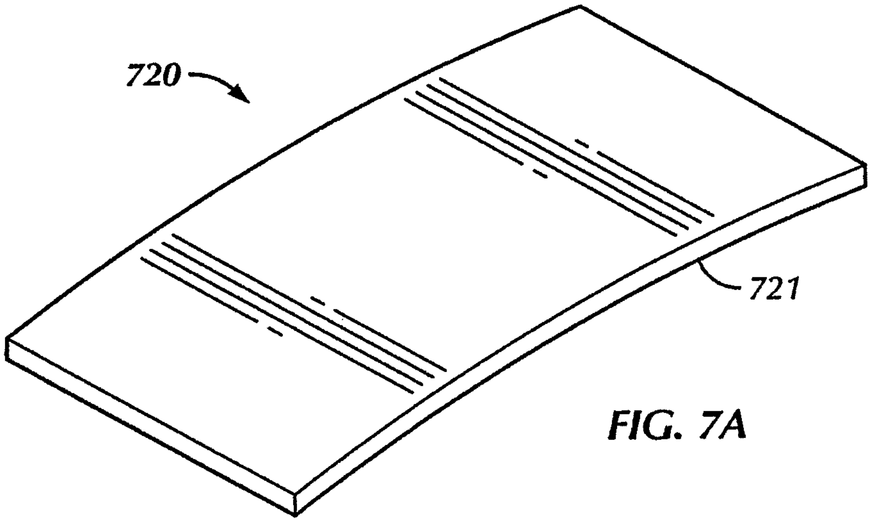
FIG. 7A is a perspective view of a screen frame with a preferential bow along a length of the screen frame in accordance with embodiments of the present disclosure.
Figure 7B:
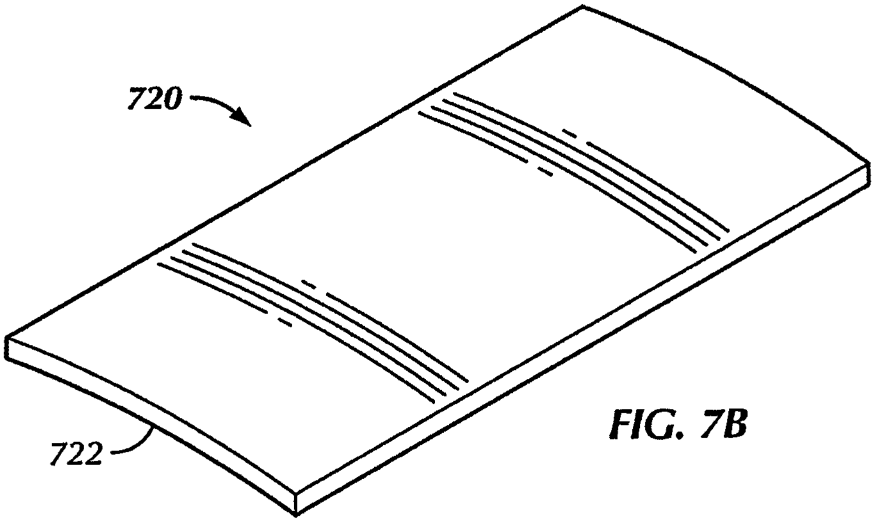
FIG. 7B is a perspective view of a screen frame with a preferential bow along a width of the screen frame in accordance with embodiments of the present disclosure.

Referring now to FIG. 7A, a perspective view of a screen frame is shown in accordance with embodiments of the present disclosure. As shown, in certain embodiments, the screen frame 720 may be configured so that the screen frame preferentially bows along the length of the screen frame only. Now referring to FIG. 7B, a component view of the screen frame is shown in accordance with embodiments of the present disclosure showing the preferential bow along a width 722 of screen frame 720 only. In still further embodiments, the screen frame may be configured to have the preferential bow along both the length and the width (not shown). The screen frame may be configured having a preferential bow as described in various embodiments above depending on sealing requirements, structural requirements of the shaker assembly or screen, or others known to those skilled in the art.

After the screen frame has cooled and contracted, the preferential bow is formed in the screen frame. The wire mesh screen may then be applied by stretching it and melting it on the screen frame. As described above, when the stretching fixture used to stretch the wire mesh screen is removed from the wire mesh screen, the tension in the mesh may cause the screen to bow. However, in embodiments disclosed herein, because of the initial preferential bow in the screen frame, the screen frame may be forced into a flatter configuration, or slightly convex bow. A convex bow of the screen frame may be defined as when the screen frame is set on the shaker bed, the screen frame will be bowed "upward" towards the center, creating more of a "dome" configuration. In embodiments disclosed herein, when assembled, the screen frame may have a flat to slightly convex configuration when attached to the shaker bed. In alternate embodiments, the screen assembly may be attached in a concave configuration in which the screen frame is bowed "downward" towards the center, forming more of a "bowl." Further, the screen frame may be configured with a sealing surface about a perimeter to form a seal with the corresponding shaker bed.

Advantageously, embodiments of the present disclosure for the screen assembly may provide a method to use the natural contraction and consequential bowing of the composite screen frame. By using the preferential bow, a screen assembly may be configured to provide adequate sealing between the screen assembly and shaker frame, and therefore reduce of prevent materials from passing around the screen perimeter. Further, the preferential bow may provide improved and more secure seating between the screen assembly and the shaker frame, thereby preventing excessive rattling and vibrations during operation. Any reduction in excessive vibrations between the screen assembly and the shaker frame may also reduce wear on components and increase the life of the entire shaker assembly.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method of manufacturing a shaker screen, the method comprising:

providing a screen frame mold having a neutral axis;

positioning reinforcement structure in the screen frame mold above the neutral axis of the screen frame mold;

injecting a material in the screen frame mold to form a screen frame having a neutral axis;

removing the screen frame from the mold, wherein the material contracts below the neutral axis of the screen frame.

2. The method of claim 1, further comprising attaching a mesh screen on the screen frame, such that the mesh screen applies tension to the screen frame, wherein the shaker screen is substantially flat.

3. The method of claim 1, wherein the shaker screen is slightly convex.

4. The method of claim 1, wherein the shaker screen is slightly concave.

5. The method of claim 1, wherein the shaker screen comprises a sealing surface to contact a shaker bed.

6. The method of claim 1, wherein the reinforcement structure is steel structure.

7. A method of manufacturing a shaker screen, the method comprising:

machining a preferential bow into a screen frame mold and injecting a material in the screen frame mold;

positioning reinforcement structure in the screen frame mold;

injecting a material in the screen frame mold and forming a screen frame;

cooling the screen frame before moving the screen frame from the screen frame mold, wherein the screen frame includes a preferential bow.

8. The method of claim 7, further comprising attaching a mesh screen on the screen frame, such that the mesh screen applies tension to the screen frame, wherein the shaker screen is substantially flat.

9. The method of claim 7, wherein the shaker screen is slightly convex.

10. The method of claim 7, wherein the shaker screen is slightly concave.

11. The method of claim 7, wherein the shaker screen comprises a sealing surface to contact a shaker bed.

12. The method of claim 7, wherein the reinforcement structure is steel structure.

* * * * *